March 19, 1935.   O. TWEIT   1,994,879

MACHINE TOOL

Filed March 16, 1933

INVENTOR
Olav Tweit

BY

Patented Mar. 19, 1935

1,994,879

UNITED STATES PATENT OFFICE 1,994,879

MACHINE TOOL

Olav Tweit, West Orange, N. J.

Application March 16, 1933, Serial No. 661,026

5 Claims. (Cl. 82—2)

This invention relates to machine tools, and more particularly, to machine tools adapted to be moved in a circular direction to bore, plane, or otherwise machine the work, as for example machine tools employed to machine the end faces of the hubs of propellers, flanges on pipes, etc. Such work, because of its size and shape, is usually maintained fixed and the machine tool rotated with respect thereto.

In the machine tools heretofore customarily employed, when it was desired to alter the position of the rotating tool, it was necessary to stop the machine tool and make the desired adjustment in the position of the tool.

It is an object of this invention to provide a machine tool, the tool of which may be rotated at a relatively rapid rate to describe circles and simultaneously moved radially; that is to say, the machine tool of this invention may be moved to describe circles and during the circular movement, without stopping or slowing up the machine, may be automatically moved linearly.

In the preferred embodiment illustrated on the drawing, the invention is shown incorporated in a machine tool for finishing the surface of the work, as, for example, the hub of a propeller, and the present description will be confined to the present illustrated embodiment of the invention. It will be understood, however, that the novel features and improvements are susceptible to other applications, such, for example, as multiple machining, i. e., boring or grinding a plurality of cylinders in a motor. Hence, the scope of this invention is not confined to the embodiment herein described.

Other objects and advantages will appear from the following detailed description, taken in connection with the accompanying drawing, in which—

Figure 2:
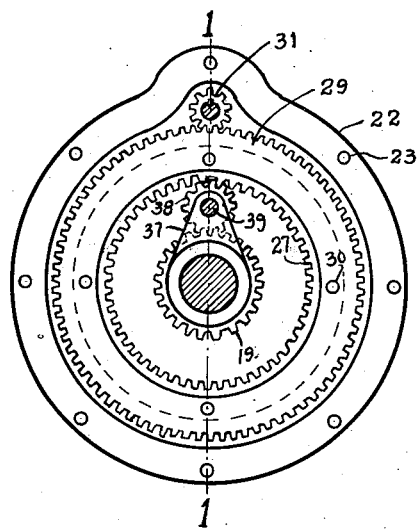
Fig. 2 is a vertical section, partly in elevation, of the machine of Fig. 1 taken in a plane passing through line 2—2 of Fig. 1.
Figure 3:
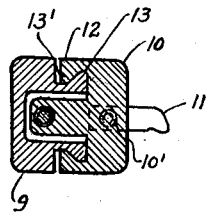
Fig. 3 is a horizontal section, partly in elevation, of the tool holder shown in Fig. 2, this figure being taken in a plane passing through line 3—3 of Fig. 1.

Referring to the drawing, reference numeral 4 indicates a shaft rotatably mounted in bearings 5 integral with a standard or support 6 having legs 7. Shaft 4 may be rotated by an electric motor or other power plant 3, which may be in driving connection with shaft 4 by means of gears 2, one of which is on the armature shaft of the motor and the other is keyed to shaft 4. Integral with, or rotatably secured to, shaft 4 is a shaft 8 having secured thereto, as for example by being keyed thereon and bolted thereto as indicated by the reference numeral 9', a tool housing 9. A toolholder 10, having detachably mounted therein, as for example by a bolt 10', a tool 11, is mounted, for reciprocating motion, on the threaded shaft 14 which passes through a threaded opening in holder 10. Holder 10 is formed as shown in Fig. 3 with extending portions 12 forming a rabbeted joint 13 with the extending arms 13' of the tool housing 9. The tool 11 in the embodiment of the invention shown on the drawing is a planing tool arranged to engage the end face of the hub of the work 11' fixed on the support 12'. Shaft 14 is rotatably mounted in bearings 15, 16 in the tool housing 9 and has keyed thereon at the base portion thereof a gear 17. Rotation of this gear causes rotation of the shaft 14 with consequent movement of the toolholder 10, either upwardly or downwardly, depending upon whether the shaft 14 is rotated in clockwise or counterclockwise direction.

A hub gear 18 is loosely mounted on shaft 8 and has teeth at the periphery thereof arranged to mesh with the teeth on gear 17. Keyed to the end of gear 18, remote from the teeth, is a gear 19. A cover plate 21, providing a bearing support for shaft 8, is fixed to the standard 6, as for example by bolts 25. A second plate 22 secured to plate 21 by bolts 23 forms a casing 24 for the transmission hereinafter described.

Figure 1:
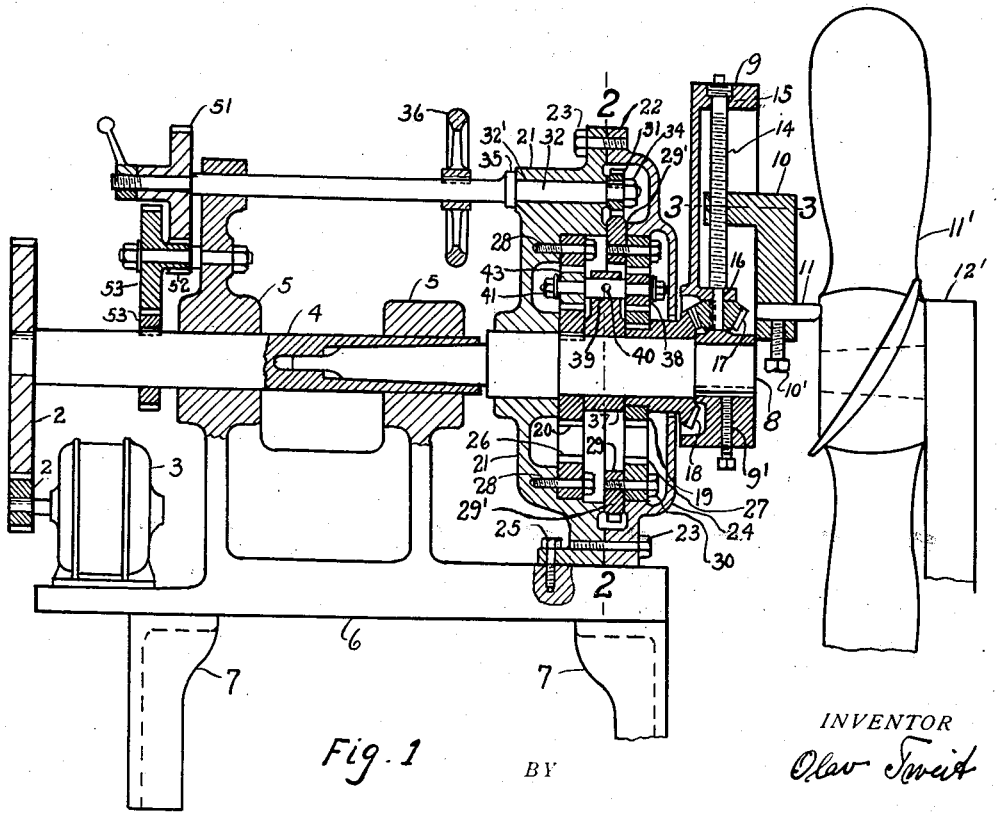
Fig. 1 is a vertical section, partly in elevation, of a machine tool embodying this invention taken in a plane passing through line 1—1 of Fig. 2.

This transmission is composed of two ring gears 26 and 27, gear 26 being fixed to plate 21, as for example by bolts 28 and gear 27 being rotatably mounted in the casing 24. Gear 27 has secured thereto by bolts 30 a ring gear 29 rotatably disposed in a machined channel 29'. Ring gears 26 and 27 are of the same size. A gear 20 is keyed to shaft 8 and has its teeth facing the teeth on ring gear 26. The teeth of ring gear 27, it will be noted, face the teeth of gear 19. A holder 37 is rotatably mounted on the shaft 8 and has fixed therein, as for example by pin 40, a stub shaft 39. Rotatably mounted on one end of the stub shaft is a pinion 43 having its teeth meshing with the teeth of ring gear 26 and gear 20. A second pinion 38 is rotatably mounted on the other end of the stub shaft 39 and has its teeth meshing with the teeth of the ring gear 27 and gear 19. Nuts and washers 41 maintain the pinions 38 and 43 on the stub shaft 39. A shaft 32 is rotatably mounted in the bearing support 32' of plate 21. Collar 35 on shaft 32 prevents lateral movement of this shaft toward the right viewing Fig. 1. This shaft has keyed at one end thereof a pinion 31 arranged to mesh with ring gear 29 to rotate this gear. A nut 34 maintains the pinion 31 on shaft 32. A hand wheel 36 is secured to the shaft 32 to rotate it manually during the rotation of the tool 11. Shaft 32 is also provided with a gear 51 keyed thereon and arranged to mesh with gear 52 driven through reduction gearing indicated generally by the reference numeral 53. The reducing gearing 53 may be driven by motor 3 when it is desired to continuously move the tool 11 linearly; otherwise, the power connection between the motor 3 and shaft 32 is rendered inoperative and the shaft 32 is actuated manually by turning the hand wheel 36.

In operation, shaft 8, with toolhousing 9, is rotated by the rotation of shaft 4 driven by motor 3 so that toolholder 10 with the tool 11 describes circles. Gear 20 rotates with shaft 8 and the pinion 43 meshing with gear 20 and the fixed ring gear 26 will therefore be caused to roll in a planetary motion around shaft 8. Pinion 38, it will be noted, has its axis in a fixed relation with that of pinion 43, and consequently, it will be rotated bodily about the axis of shaft 8. Pinion 43 meshes with ring gear 27 and gear 19 and it will therefore roll between these gears. When ring gear 27 is kept fixed, the pinion 38 will rotate about stub shaft 39 as an axis and will rotate the gear 19 at a speed equal to that of gear 20. Consequently, the shaft 8 and the hub gear 18 will rotate at the same speed so that there will be no relative movement between these two members. Hence gear 17 and threaded shaft 14 will not be rotated and the screw 14 and toolholder 10 will during the rotation of shaft 8 remain in a fixed position. When it is desired to alter the position of the tool during the rotation of shaft 8, hand wheel 36 is turned, rotating pinion 31 meshing with ring gear 29, causing rotation of ring gear 27 bolted to gear 29. This will accelerate or deaccelerate the rotary speed of pinion 38, depending upon the direction of rotation of gear 29. Since the planetary speed of pinion 38 is fixed with relation to the speed of rotation of shaft 8, the motion imparted to ring gear 27 will be transmitted to gears 19 and 18, causing an acceleration or deacceleration of these gears in relation to the speed of shaft 8. The movement thus imparted to hub gear 18 will be transmitted through gear 17 to threaded shaft 14, causing the toolholder 10 to move linearly during its circular movements.

If instead of manually moving shaft 35, this shaft were driven through reduction gearing 53, the tool 11 would be moved continuously in a radial direction during the circular motion of tool 11 so that the work would be machined from end to end thereof.

While preferred embodiments of this invention have been shown and described, it will be understood that various changes may be made by those skilled in the art without departing from this invention. For example, the toolholder may be moved longitudinally to the axis of shaft 8 or at an angle other than a right angle by changing the gears 17 and 18 or instead of screw shaft 14, gears may be employed to impart linear movement to the tool 11. The invention, therefore, is not to be limited to the disclosure herein but only by the scope of the appended claims.

What is claimed is:

1. In a machine tool, in combination, a rotating shaft, a toolholder fixed to said shaft and rotatable therewith, a threaded shaft rotatably mounted in said toolholder, a tool carried by said threaded shaft and arranged to be moved in a linear direction upon rotary movement of said threaded shaft, a gear fixed to said threaded shaft, a second gear rotatably mounted on said shaft and meshing with the first-mentioned gear, a third gear keyed to said shaft, a fixed ring gear having its teeth disposed facing the teeth on said third gear and spaced therefrom, a holder on said shaft, a pinion meshing with said third gear and fixed ring gear rotatably mounted on said holder, a second pinion carried by said holder and in driving engagement with said second gear, a second ring gear arranged to mesh with said second pinion, and means for moving said second ring gear.

2. In a machine tool, in combination, a rotatable tool, and means for rotating said tool and simultaneously moving said tool in a linear direction, said means comprising a rotating shaft, a pair of gears on said shaft, a pair of ring gears having their teeth facing the teeth on said first-mentioned pair of gears, a pair of pinions disposed with their teeth meshing with both the ring gears and the first-mentioned gears, one of said ring gears being fixed and the other being movable.

3. A transmission for imparting both circular and linear motion comprising a rotating shaft, a pair of gears on said shaft, a pair of ring gears having their teeth facing the teeth on said first-mentioned pair of gears, a pair of pinions disposed with their teeth meshing with both the ring gears and the first-mentioned gears, one of said ring gears being fixed and the other being movable.

4. A transmission for imparting both circular and linear motion comprising a rotating shaft, a pair of gears on said shaft, a pair of ring gears having their teeth facing the teeth on said first-mentioned pair of gears, a pair of pinions disposed with their teeth meshing with both the ring gears and the first-mentioned gears, one of said ring gears being fixed and the other being movable, and means for rotating said movable gear.

5. In a machine tool, in combination, a rotating shaft, a toolholder fixed to said shaft and rotatable therewith, a threaded shaft rotatably mounted in said toolholder, a tool carried by said threaded shaft and arranged to be moved in a linear direction upon rotary movement of said threaded shaft, a gear fixed to said threaded shaft, a second gear rotatably mounted on said first-mentioned shaft and meshing with the first-mentioned gear, a fixed casing through which said rotating shaft extends, a ring gear fixed to said casing, a gear keyed to the first-mentioned shaft and having its teeth facing the teeth of said ring gear, a holder rotatably mounted on said rotating shaft, a stub shaft carried by said holder, a pinion rotatably mounted on said stub shaft and having its teeth meshing with the teeth of said ring gear and the gear keyed to said rotating shaft, another gear fixed to said second-mentioned gear, a second pinion rotatably mounted on said stub shaft and meshing with the gear fixed to said second-mentioned gear, a second ring gear having its teeth facing the teeth on the gear fixed to said second-mentioned gear, said second ring gear meshing with said second pinion, and means for rotating said second ring gear.

OLAV TWEIT.